(12) United States Patent
Thomas et al.

(10) Patent No.: US 11,739,801 B2
(45) Date of Patent: Aug. 29, 2023

(54) COUPLING ASSEMBLY AND RATCHETING LOCKING MEMBER FOR USE THEREIN

(71) Applicant: Means Industries, Inc., Saginaw, MI (US)

(72) Inventors: Steven M. Thomas, Saginaw, MI (US); Riley C. Moore, Flint, MI (US); Spencer J. Kane, Chesaning, MI (US); Scott D. Bostian, Kingston, MI (US)

(73) Assignee: Means Industries, Inc., Saginaw, MI (US)

( * ) Notice: Subject to any disclaimer, the term of this patent is extended or adjusted under 35 U.S.C. 154(b) by 62 days.

(21) Appl. No.: 17/331,291

(22) Filed: May 26, 2021

(65) Prior Publication Data

US 2021/0372491 A1 Dec. 2, 2021

Related U.S. Application Data

(60) Provisional application No. 63/033,294, filed on Jun. 2, 2020.

(51) Int. Cl.
| | | |
|---|---|---|
| *F16D 41/12* | (2006.01) | |
| *F16D 41/14* | (2006.01) | |
| *F16D 13/02* | (2006.01) | |

(52) U.S. Cl.
CPC .......... *F16D 41/125* (2013.01); *F16D 13/02* (2013.01); *F16D 41/14* (2013.01)

(58) Field of Classification Search
CPC ........ F16D 41/12; F16D 41/125; F16D 41/14; F16D 41/084; F16D 43/04
USPC ............................ 192/46, 69.1, 103 R–103 B
See application file for complete search history.

(56) References Cited

U.S. PATENT DOCUMENTS

| | | | |
|---|---|---|---|
| 6,814,200 B2 | 11/2004 | Stefina | |
| 8,844,693 B2 | 9/2014 | Pawley | |
| 10,145,428 B2 | 12/2018 | Pawley et al. | |
| 11,162,543 B2* | 11/2021 | Peglowski | F16D 41/12 |
| 2018/0266503 A1 | 9/2018 | Shioiri et al. | |

(Continued)

OTHER PUBLICATIONS

International Searching Authority, The International Search Report and the Written Opinion for International Application No. PCT/US2021/035345, dated Sep. 1, 2021.

*Primary Examiner* — Richard M Lorence
(74) *Attorney, Agent, or Firm* — Burgess Law Office, PLLC

(57) ABSTRACT

A coupling assembly includes first and second coupling members, a locking member, and a blocking structure. The locking member may be a strut, a pawl, or the like. The locking member is disposed between the coupling members and is movable between coupling and uncoupling positions. The coupling position is characterized by abutting-engagement of the locking member with each coupling member. The uncoupling position is characterized by non-abutting engagement of the locking member with at least the first coupling member. The blocking structure is associated with at least one of the first coupling member and the locking member. The blocking structure prevents the locking member from entering the coupling position, and thereby prevents abutting engagement of the locking member with the first coupling member, while rotation of the first coupling member in an engagement direction relative to the second coupling member is above a predetermined rotational speed.

23 Claims, 10 Drawing Sheets

(56) References Cited

U.S. PATENT DOCUMENTS

| | | |
|---|---|---|
| 2020/0109749 A1 | 4/2020 | Thomas |
| 2020/0124115 A1 | 4/2020 | Hand et al. |
| 2020/0173499 A1 | 6/2020 | Moore et al. |
| 2020/0173502 A1 | 6/2020 | Bostian |

* cited by examiner

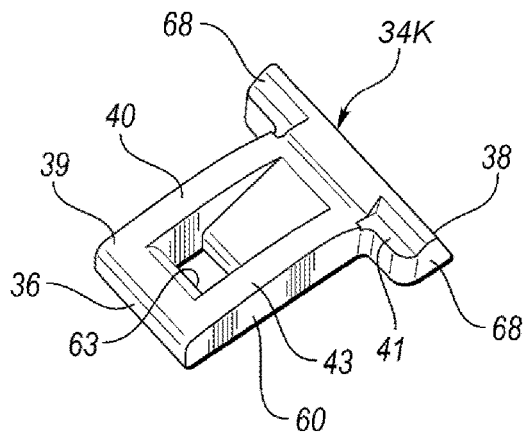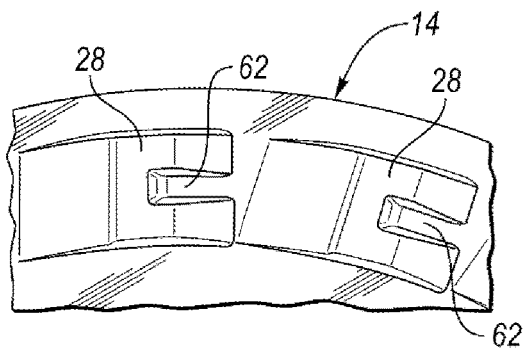
FIG. 8A  FIG. 8B
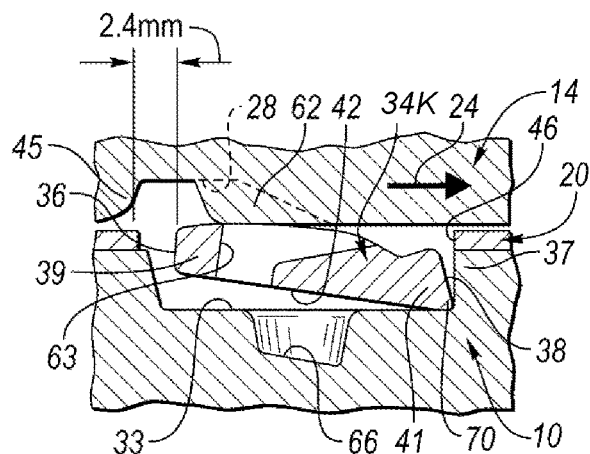
FIG. 9A
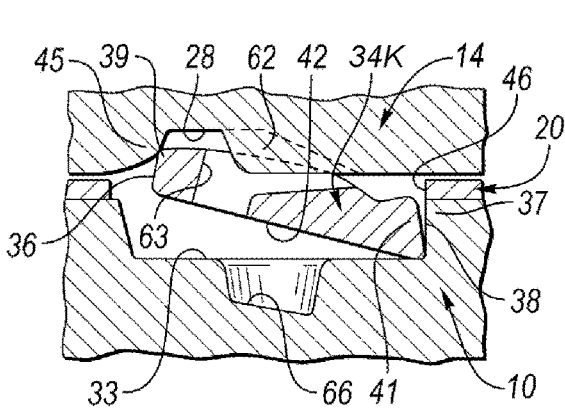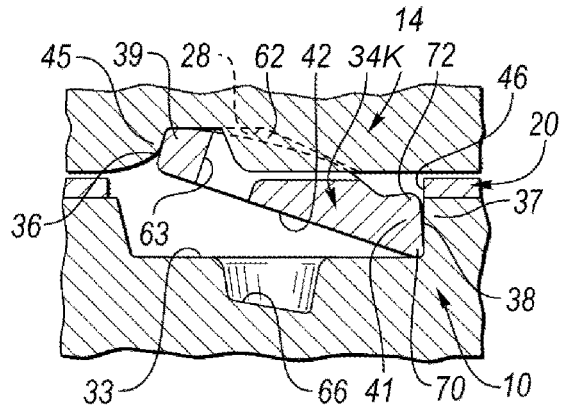
FIG. 9B  FIG. 9C

COUPLING ASSEMBLY AND RATCHETING LOCKING MEMBER FOR USE THEREIN

CROSS-REFERENCE TO RELATED APPLICATIONS

This application claims the benefit of U.S. Provisional Application No. 63/033,294, filed Jun. 2, 2020, the disclosure of which is hereby incorporated in its entirety by reference herein.

TECHNICAL FIELD

This invention relates in general to the field of coupling assemblies and locking members for use therein.

BACKGROUND

As described in U.S. Pat. No. 8,844,693, overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such coupling often comprise an outer race concentrically disposed with respect to an inner race, the outer race having cammed surfaces that define a pocket in which coupling rollers are assembled.

The driving member is connected to one race, and the driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes overrunning coupling sprags disposed between the inner cylindrical surface of an outer race and the outer cylindrical surface of an inner race so that the sprags lock the races together as torque is delivered to the driven member. The sprags become unlocked with respect to the inner and outer race surfaces when torque transfer is interrupted.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A pocket plate may be provided with angularly disposed recesses or pockets about the axis of a one-way clutch. The pockets are formed in the planar surface of the pocket plate. Each pocket receives a torque transmitting locking member. One end or tail of the locking member engages an anchor point in a pocket of the pocket plate. An opposite edge of the locking member, which may be referred to as an active edge or nose, is movable from a position within the pocket to a position in which the nose extends outwardly from the planar surface of the pocket plate. The locking members may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,964,331; 5,927,455; 5,979,627; 6,065,576:6,116,394; 6,125,980; 6,129,190; 6,186,299; 6,193,038; 6,244,965; 6,386,349; 6,481,551; 6,505,721; 6,571,926; 6,854,577; 7,258,214; 7,275,628; 7,344,010; and 7,484,605.

Yet still other related U.S. patents include U.S. Pat. Nos. 4,200,002; 5,954,174; and 7,025,188. More recent related patent documents include: U.S. Pat. Nos. 7,100,756; 7,223, 198; 7,383,930; 7,448,481; 7,451,862; 7,455,156; 7,455, 157; 7,450,548; 7,614,486; 7,661,518; 7,743,678; 7,942, 781; 7,98,372; 7,992,695; 8,042,669; 8,042,670; 8,051,959; 8,056,690; 8,079,453; 8,083,042; 8,091,696; 8,491,439; 8,646,587; 8,720,659; 8,881,516; 8,986,157; 9,121,454 9,186,977; 9,188,170; 9,188,172; and 9,188,174. Also included are published U.S. patent applications Nos. 2008/ 0110715; 2011/0269587; 2011/0183806; 2011/0214962; 2011/0297500; 2008/0169165; 2009/0159391; and 2010/ 0288592.

Normally the desire is to keep the controllable locking members of a controllable or selectable one-way clutch covered by a selector plate to keep them from inadvertently engaging the notch plate of the clutch. If the controllable locking members are exposed during overrun, then they can lock to the notch plate. When this happens above a predetermined safe speed, the results can be a broken clutch and the vehicle owner is left with a broken transmission.

In other words, a potential failure condition occurs when a slide or selector plate is shifted or moved during the overrun mode or state, exposing one or more locking members to engage with the notch plate at high speed.

Also, with a selectable or controllable one-way clutch or brake, a non-synchronous engagement of the locking members with the notch plate at high speeds could be detrimental. A non-synchronous engagement occurs when the locking members are kept from engaging when the clutch or brake is rotating in what would be the lock direction and then the locking members are suddenly able to engage. An engagement at a high speed with a high inertia can cause failure instantly.

U.S. Pat. Nos. 10,145,428 and 10,539,198 (both of which are assigned to the Assignee of the present application) disclose a coupling assembly having an overrun mode and a channeled locking member. The locking member has a ramped, open channel extending through a nose and main body of the locking member to an upper face of the main body. The locking member is movable between first and second positions. The first position is a coupling position, and the second position is an uncoupling position. Pressurized fluid directed to a bottom of the channel urges the locking member towards the second position upon rotation of a first member of the assembly in a first direction.

SUMMARY OF EXAMPLE EMBODIMENTS

An object of at least one embodiment of the present invention is to provide a coupling assembly and a ratcheting locking member for use therein, wherein a blocking structure is added to the locking member and/or a notch plate of the coupling assembly so that an uncovered or exposed locking member does not engage the notch plate until a predetermined, safe "low" rotational speed is reached. The blocking structure prevents the locking member from entering and engaging a notch of the notch plate at "high" rotational speeds. While the blocking structure prevents the locking member from engagement the locking member is ratcheting. The use of such a blocking structure makes the coupling assembly more robust and failsafe as it does not rely solely on the selector plate to keep the locking member from engaging the notch of the notch plate at "high" rotational speeds.

In carrying out the above object and other objects of at least one embodiment of the present invention, a coupling assembly is provided. The coupling assembly includes first and second coupling members, a locking member, and a blocking structure (or blocking means). The first and second coupling members include first and second coupling faces, respectively, in close-spaced opposition with one another. At least one of the coupling members is mounted for rotation about an axis. The locking member is disposed between the coupling faces of the coupling members and is movable between coupling and uncoupling positions. The coupling position is characterized by abutting-engagement of the locking member with each of the coupling members. The uncoupling position is characterized by non-abutting engagement of the locking member with at least the first coupling member. The blocking structure is associated with at least one of the first coupling member and the locking member. The blocking structure prevents the locking member from entering the coupling position, and thereby prevents abutting engagement of the locking member with the first coupling member, while rotation of the first coupling member in a an engagement direction relative to the second coupling member is above a predetermined rotational speed.

In embodiments, the blocking structure is associated only with the locking member. In other embodiments, the blocking structure is associated only with the first coupling member. In other embodiments, the blocking structure is associated with both the locking member and the first coupling member.

In embodiments, the blocking structure that is associated with the locking member is a rib, protuberance, or protrusion on the locking member. In embodiments, the blocking structure that is associated with the first coupling member is a rib, protuberance, or protrusion on the first coupling face of the first coupling member.

The abutting-engagement of the locking member with the first coupling member in the coupling position may further be characterized by abutting-engagement of a nose of the locking member with a shoulder of the first coupling member. In this case, the blocking structure preventing the locking member from entering the coupling position thereby prevents abutting engagement of the nose of the locking member with the shoulder of the first coupling member.

The first coupling member may be a notch plate and the second coupling member may be a pocket plate.

The coupling assembly may be a controllable or selectable one-way clutch assembly.

The coupling assembly may further include a control element between the coupling faces and operable to control a position of the locking member. The control element may have at least one opening which extends completely therethrough to allow the locking member to extend therethrough to the coupling position. The control element may be a control plate or a selector plate rotatable about the axis.

In embodiments, the predetermined rotational speed is within a range of one to 200 revolutions per minute.

The coupling assembly may further include a biasing member carried by the second coupling member to urge the locking member toward the coupling position.

The locking member may move between the coupling and uncoupling positions by pivoting.

The locking member may be a strut, a pawl, or the like. The locking member in the form of a strut may be a teeter-totter strut, a radial strut, or the like.

Further in carrying out the above object and other objects of at least one embodiment of the present invention, a locking member for use in a coupling assembly having first and second coupling members is provided. The locking member includes a body and a blocking structure on the body. The blocking structure prevents the locking member from entering a coupling position, characterized by abutting-engagement of the locking member with each of the first and second coupling members, while rotation of the first coupling member in an engagement direction relative to the second coupling member is above a predetermined rotational speed.

The blocking structure may be a rib, protuberance, or protrusion.

The locking member may further include a member-engaging nose. Abutting engagement of the locking member with the first coupling member in the coupling position may further be characterized by abutting-engagement of the nose of the locking member with a shoulder of the first coupling member. In this case, the blocking structure preventing the locking member from entering the coupling position thereby prevents abutting engagement of the nose of the locking member with the shoulder of the first coupling member.

The locking member may further include a pair of oppositely projecting ears.

The locking member may be a planar locking member, a teeter-totter locking member, or a radial locking member.

The blocking structure may include one or more integrally formed rib portions on an upper face of a main body portion of the locking member. The rib portion may be centrally located between side faces of the main body of the locking member.

BRIEF DESCRIPTION OF THE DRAWINGS

FIG. 8A is a perspective, schematic view of a locking member with a through hole constructed in accordance with yet another embodiment of the present invention;

FIG. 8B is a top plan view, partially broken away, of a notch plate having a center rib on a coupling face of the notch plate for use with the locking member of FIG. 8A;

FIGS. 9A, 9B and 9C are views, partially broken away and in cross section, which show parts of the coupling assembly of FIGS. 8A and 8B at the start of locking member rise, during locking member rise and at locking member full engagement, respectively:

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are, not to be interpreted as limiting, but merely as a representative basis for teaching one skilled in the art to variously employ the present invention.

Figure 1A:
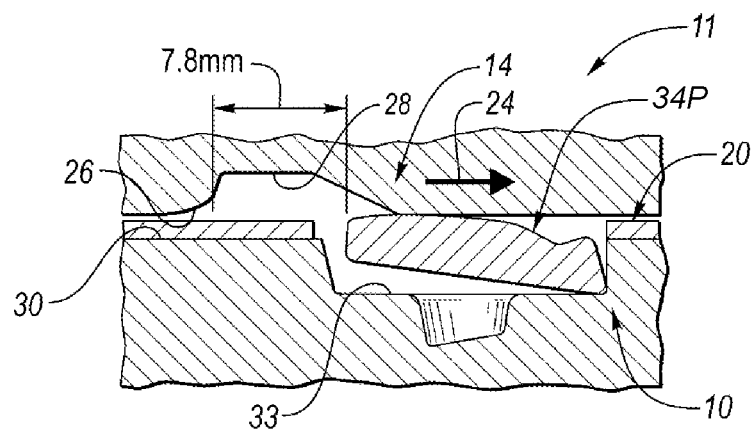
FIGS. 1A, 1B and 1C are views, partially broken away and in cross section, which show a prior art coupling assembly at the start of locking member rise, during locking member rise and at locking member full engagement, respectively.
Figure 1B:
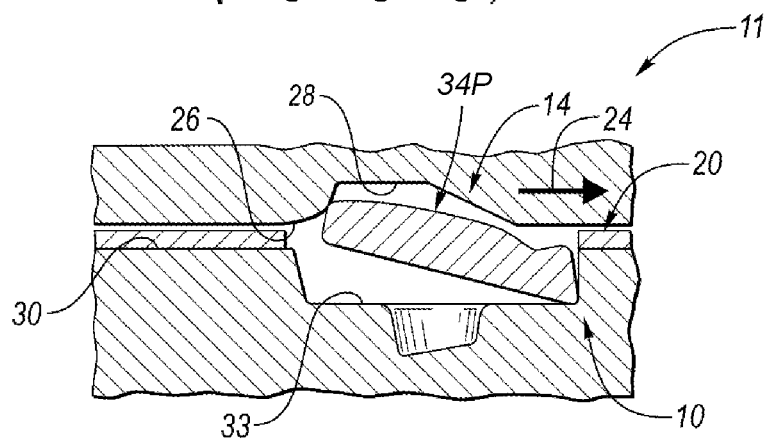
Figure 1C:
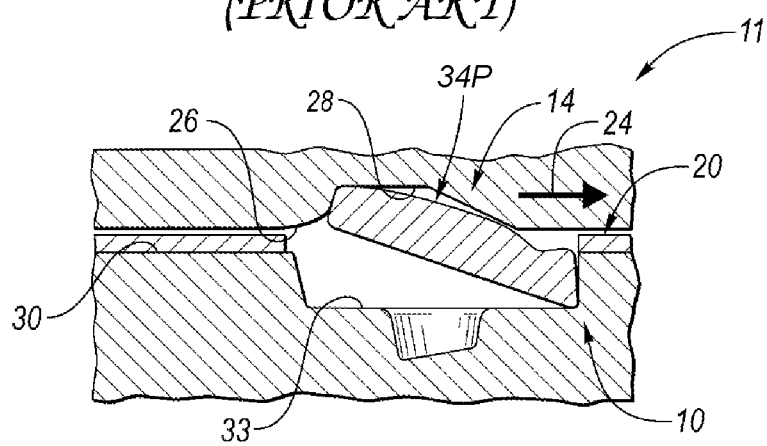
Figure 2A:
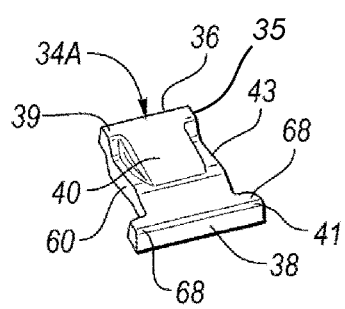
FIG. 2A is a perspective, schematic view of a locking member (i.e., strut) constructed in accordance with one embodiment of the present invention.
Figure 2B:
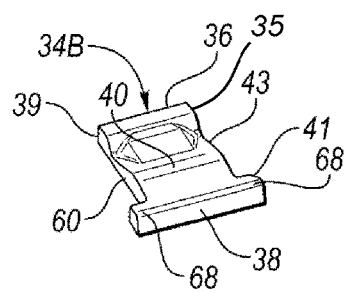
FIG. 2B is a perspective, schematic view of a locking member (i.e., strut) constructed in accordance with another embodiment of the present invention.
Figure 2C:
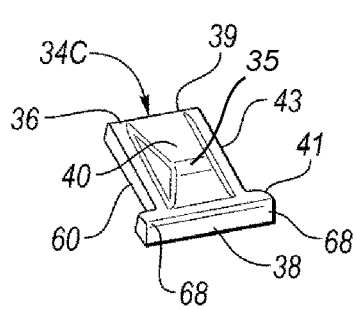
FIG. 2C is a perspective, schematic view of a locking member (i.e., strut) constructed in accordance with another embodiment of the present invention.
Figure 2D:
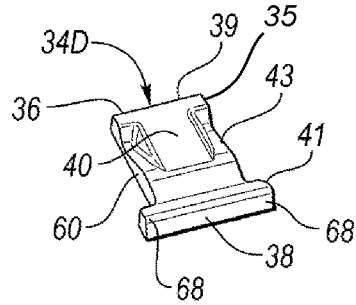
FIG. 2D is a perspective, schematic view of a locking member (i.e., strut) constructed in accordance with another embodiment of the present invention.
Figure 2E:
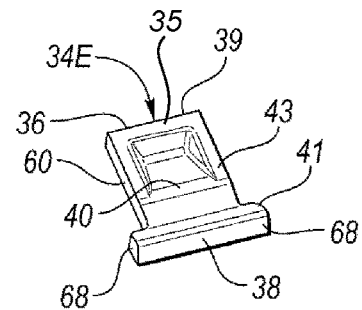
FIG. 2E is a perspective, schematic view of a locking member (i.e., strut) constructed in accordance with another embodiment of the present invention.
Figure 2F:
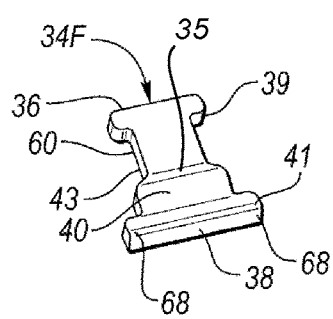
FIG. 2F is a perspective, schematic view of a locking member (i.e., strut) constructed in accordance with another embodiment of the present invention.
Figure 2G:
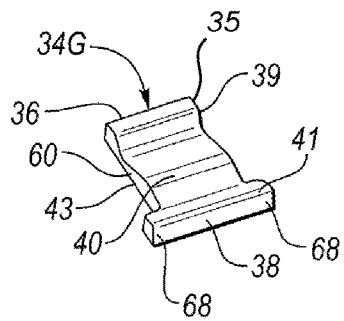
FIG. 2G is a perspective, schematic view of a locking member (i.e., strut) constructed in accordance with another embodiment of the present invention.
Figure 2H:
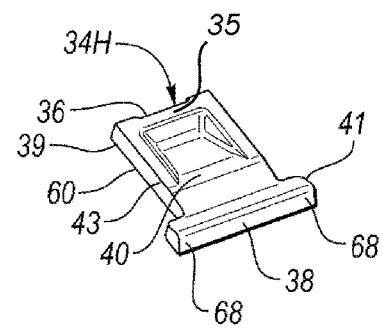
FIG. 2H is a perspective, schematic view of a locking member (i.e., strut) constructed in accordance with another embodiment of the present invention.
Figure 2I:
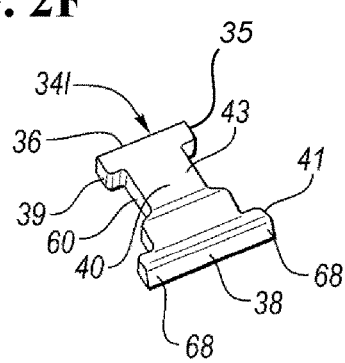
FIG. 2I is a perspective, schematic view of a locking member (i.e., strut) constructed in accordance with another embodiment of the present invention.
Figure 2J:
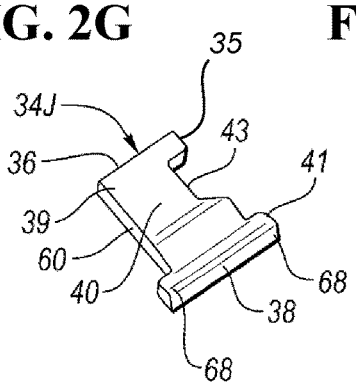
FIG. 2J is a perspective, schematic view of a locking member (i.e., strut) constructed in accordance with another embodiment of the present invention.

As shown in prior art FIGS. 1A-1C, in general, for ratcheting to occur in a coupling assembly having a first coupling member (i.e., a notch plate 14) and a second coupling member (i.e., a pocket plate 10), a locking member (i.e., a strut) 34P, the reference numeral 34P refers to a prior art locking member or strut, must not be able to rise far enough to reach an abutting engagement with a shoulder 45 in a notch 28 of notch plate 14 by the time notch shoulder 45 aligns with an engagement nose 39 of locking member 34P in the direction marked 24. In other words, for ratcheting to occur, after locking member 34P is allowed to start rising while notch plate 14 is rotating relative to pocket plate 10 in the direction 24, notch shoulder 45 must pass locking member engagement nose 39 before locking member 34P has risen to the critical angle that allows locking member engagement nose 39 to engage with notch shoulder 45. For a ratcheting clutch design, there will be a critical relative speed between notch plate 14 and pocket plate 10, above which this condition is met and ratcheting occurs, and below which this condition is not met, and ratcheting does not occur. Below the critical speed when ratcheting does not occur, locking member 34P abuttingly engages in notch shoulder 45 and carries torque by locking the two coupling members 10 and 14 together.

The critical speed is determined by two primary factors: (i) the angular distance that notch plate 14 travels relative to pocket plate 10 from when locking member 34P is allowed to start rising to when notch shoulder 45 aligns with locking member engagement face 39; and (ii) the amount of time that locking member 34P takes to reach the critical angle at which it can make abutting engagement with the notch shoulder 45, after locking member 34P is allowed to start rising.

An embodiment of the present invention provides a blocking structure on locking member 34 and/or notch plate 14, which shortens the angular distance that notch plate 14 travels relative to pocket plate 10 from when locking member 34 is allowed to start rising to when the notch shoulder 45 aligns with locking member engagement nose 39, which reduces the critical speed above which the locking member ratchets and below which the locking member engages in notch 28. Since the blocking structure reduces the critical speed, it reduces the impact speed and the resulting damage in the case that the controllable locking member is allowed to rise toward notch 28 while notch plate 14 is rotating in what would be engagement direction 24 relative to pocket plate 10.

FIGS. 1A, 1B, and 1C show a prior art pocket member or plate, generally indicated at 10, of a planar coupling or clutch assembly, generally indicated at 11. A notch plate, generally indicated at 14 of assembly 11, is typically nested within pocket plate 10. Notch plate 14 may be connected to a part (not shown) via internal splines formed on notch plate 14, which engage splines on the part. Pocket plate 10 may be typically provided with external splines.

An actuator (not shown) may be drivably connected to a control or selector plate, generally indicated at 20, thereby causing control plate 20 to be adjusted angularly with respect to a central axis about which at least one of the plates 10 and 14 is rotatable. Control plate 20 is disposed between plates 10 and 14 for limited angular rotation relative to the plates, as generally illustrated in U.S. Pat. No. 7,344,010.

Notch plate 14 is prevented from moving in one angular direction as indicated by arrow 24 about the central axis relative to pocket plate 10 when the locking members 34P are uncovered by control plate 20. The motion of arrow 24 is achieved in an operating mode when the actuator adjusts the angular position of control plate 20 relative to pocket plate 10 (such as via a fork) about the central axis to a position which covers up the locking members.

Notch plate 14 has a coupling face 26 with one or more notches 28 formed therein. Notch plate 14 may be adapted to be received in pocket plate 10 as previously mentioned.

Pocket plate 10 has a coupling face 30 with pockets 33 formed therein. Located intermediate coupling faces 26 and 30 of notch plate 14 and pocket plate 10, respectively, is control plate 20.

Referring now to FIGS. 2 through 11C, there are illustrated a plurality of locking members (i.e., struts, pawls, or the like) 34A-34L as well as a plurality of coupling members such as notch and pocket plates constructed in accordance with the present invention. In each of the embodiments of FIGS. 2 through 11C, only locking member 34A-34L and notch plate 14 geometry changes from the prior art locking member 34P and notch plate geometry of FIGS. 1A, 1B, and 1C. Each of locking members 34A-34L includes a first end surface or face 36 at a nose end 39. Each of the locking members 34A-34L further includes a second end surface or face 38 at a tail end 41 opposite the first end surface 36. The tail end 41 engages a shoulder 37 in pocket plate 10. Each of the locking members 34A-34L further includes an upper face 40 and a lower face 42 of a main body portion 43.

Locking member 34A-34L is movable between coupling and uncoupling positions. The coupling position is characterized by abutting-engagement of locking member 34A-34L with each pocket plate 10 and notch plate 14. Particularly, the abutting-engagement of locking member 34A-34L with notch plate 14 in the coupling position is characterized by abutting-engagement of locking member nose 39 with notch shoulder 45. The uncoupling position is characterized by non-abutting engagement of locking member 34 with at least notch plate 14.

Figure 10A:
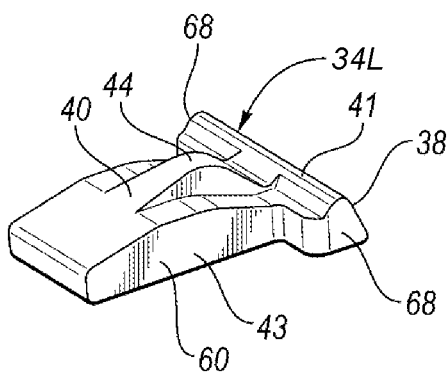
FIG. 10A is a perspective, schematic view of a locking member with a "high" center rib constructed in accordance of still another embodiment of the present invention.
Figure 11A:
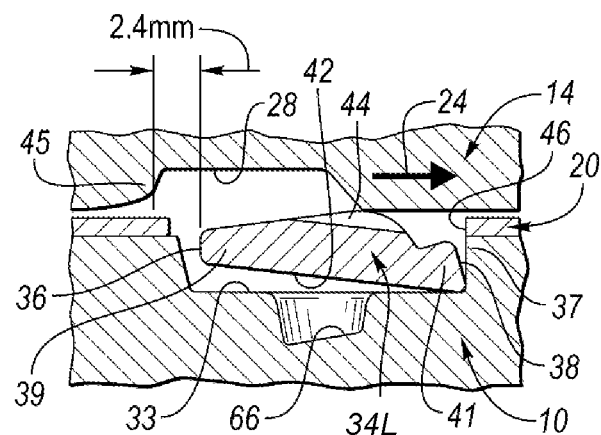
FIGS. 11A, 11B and 11C are views, partially broken away and in cross section, which show the parts of the coupling assembly of FIGS. 10A, 10B and 10C at the start of locking member rise, during locking member rise and at locking member full engagement, respectively.
Figure 10B:
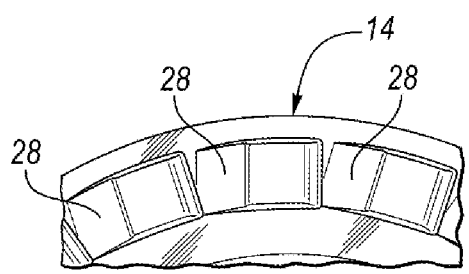
FIG. 10B is a top plan view, partially broken away, of a notch plate for use with the locking member of FIG. 10A.
Figure 11B:
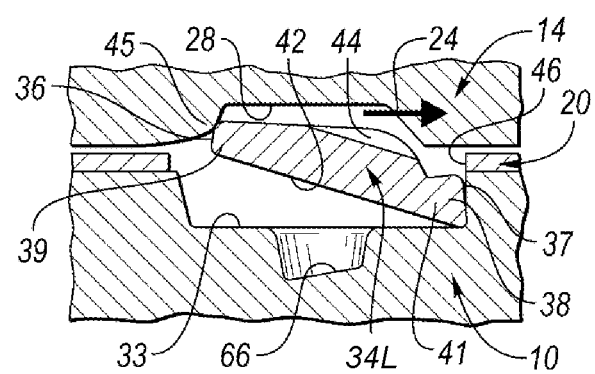
Figure 10C:
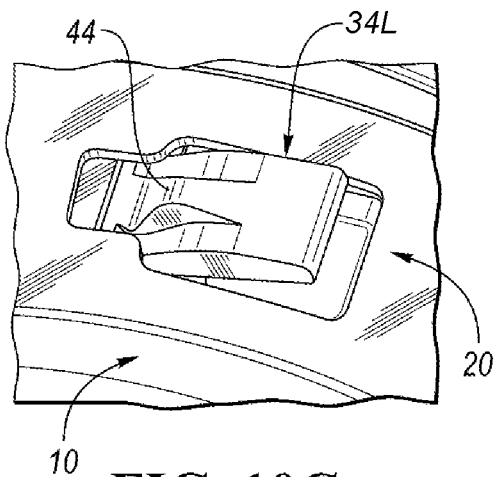
FIG. 10C is a perspective, schematic view, partially broken away, showing the locking member of FIG. 10A in a pocket plate and at least partially covered by a selector plate.
Figure 11C:
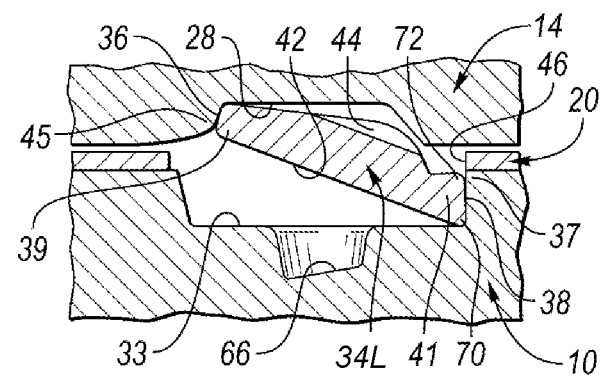

Locking member 34L also includes a blocking structure on upper face 40 of main body portion 43 in the form of a center rib 44 in FIGS. 10A and 10C. Center rib 44 keeps locking member 34L in the uncoupling position characterized by non-abutting engagement of nose 39 with notch plate 14 upon rotation (i.e., in direction 24) of notch plate 14 relative to pocket plate 10 above a predetermined rotational speed. That is, the blocking structure prevents locking member 34L from entering the coupling position, and thereby prevents abutting engagement of locking member 34L with notch plate 14, while rotation of notch plate 14 in a first direction (i.e., in direction 24) relative to pocket plate 10 is above the predetermined rotational speed. In embodiments, the predetermined rotational speed falls within a range of zero to 200 revolutions per minute. The predetermined rotational speed depends on the design of the blocking structure.

Referring now to FIG. 10A, preferably, center rib 44 is centrally located between side faces 60 of main body portion 43 of locking member 34L.

Figure 4A:
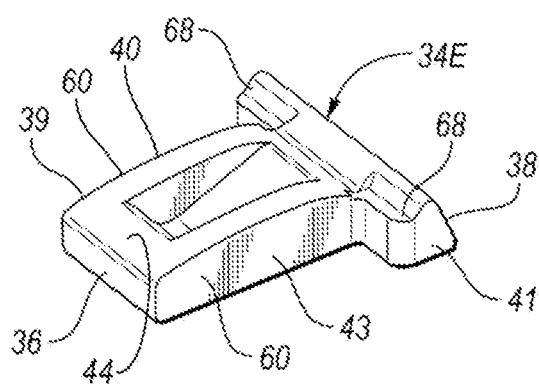
FIG. 4A is a perspective schematic view of a locking member constructed in accordance with at least one embodiment of the present invention.
Figure 4B:
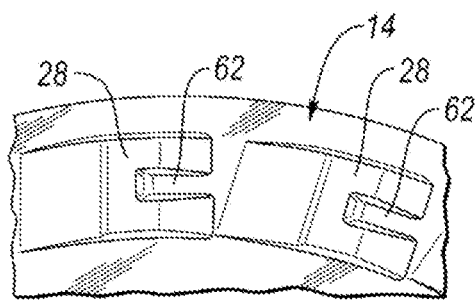
FIG. 4B is a top plan view, partially broken away, of a notch plate for use with the locking member of FIG. 4A wherein each of the notches of the notch plate has a center rib thereon.
Figure 5B:
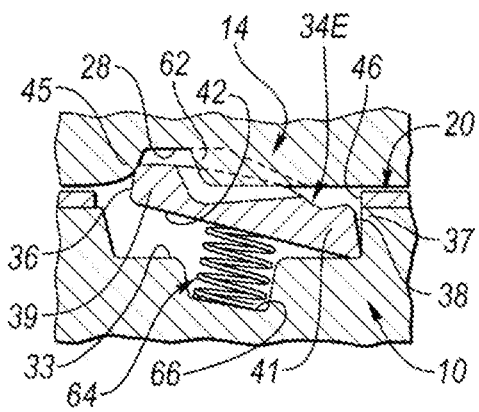
Figure 4C:
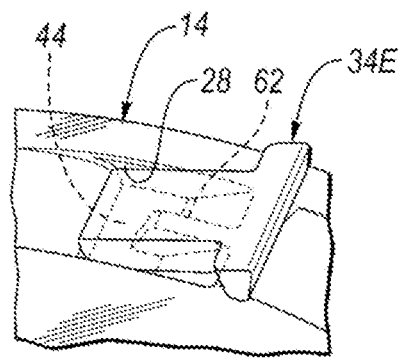
FIG. 4C is a perspective, schematic view, partially broken away, showing the locking member of FIG. 4A in one of the notches of FIG. 4B.
Figure 5C:
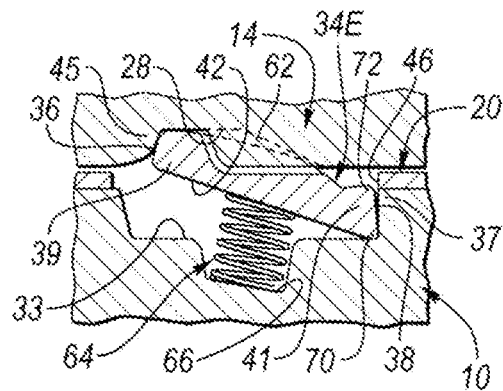
Figure 6A:
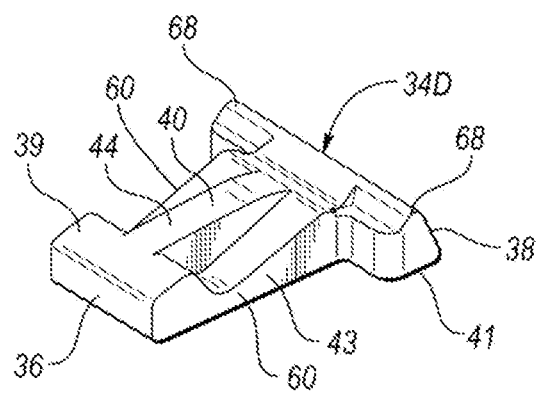
FIG. 6A is a perspective, schematic view of a locking member having a center rib thereon constructed in accordance with another embodiment of the present invention.
Figure 7A:
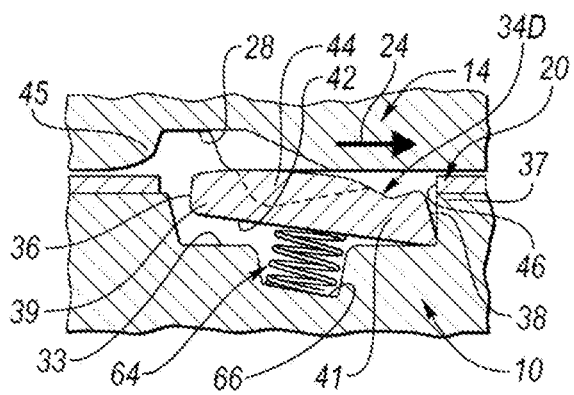
FIGS. 7A, 7B and 7C are views, partially broken away and in cross section, which show parts of the coupling assembly of FIGS. 6A, 6B, and 6C at the start of locking member rise, during locking member rise and at locking member full engagement, respectively.
Figure 6B:
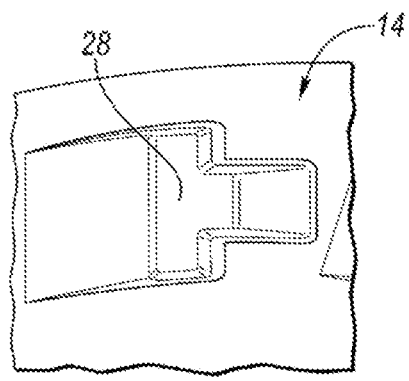
FIG. 6B is a top plan view, partially broken away, of a notch plate for use with the locking member of FIG. 6A.
Figure 7B:
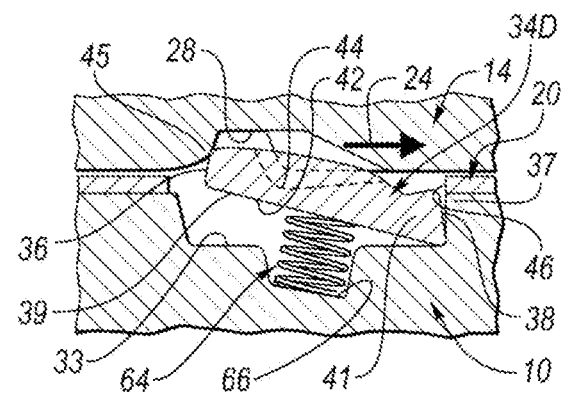
Figure 6C:
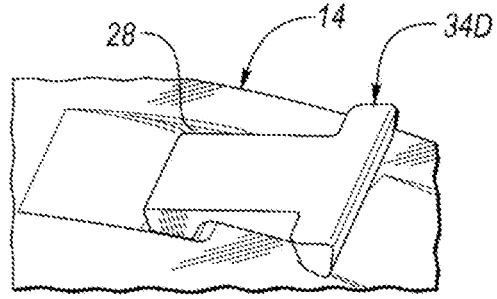
FIG. 6C is a perspective, schematic view, partially broken away, showing the locking member of FIG. 6A in the notch of FIG. 6B.
Figure 7C:
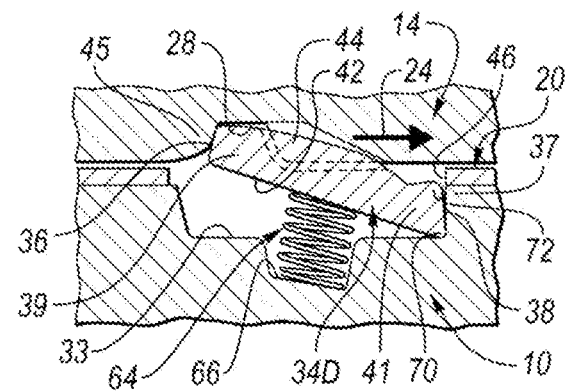

In the embodiments of FIGS. 4B and 8B, the blocking structure also takes the form of a center rib 62 within each notch 28 of the notch plate 14. In the embodiment of FIG. 8A, locking member strut 34K has a hole 63 formed through main body portion 43 between upper and lower faces 40 and 42, respectively.

Figure 3:
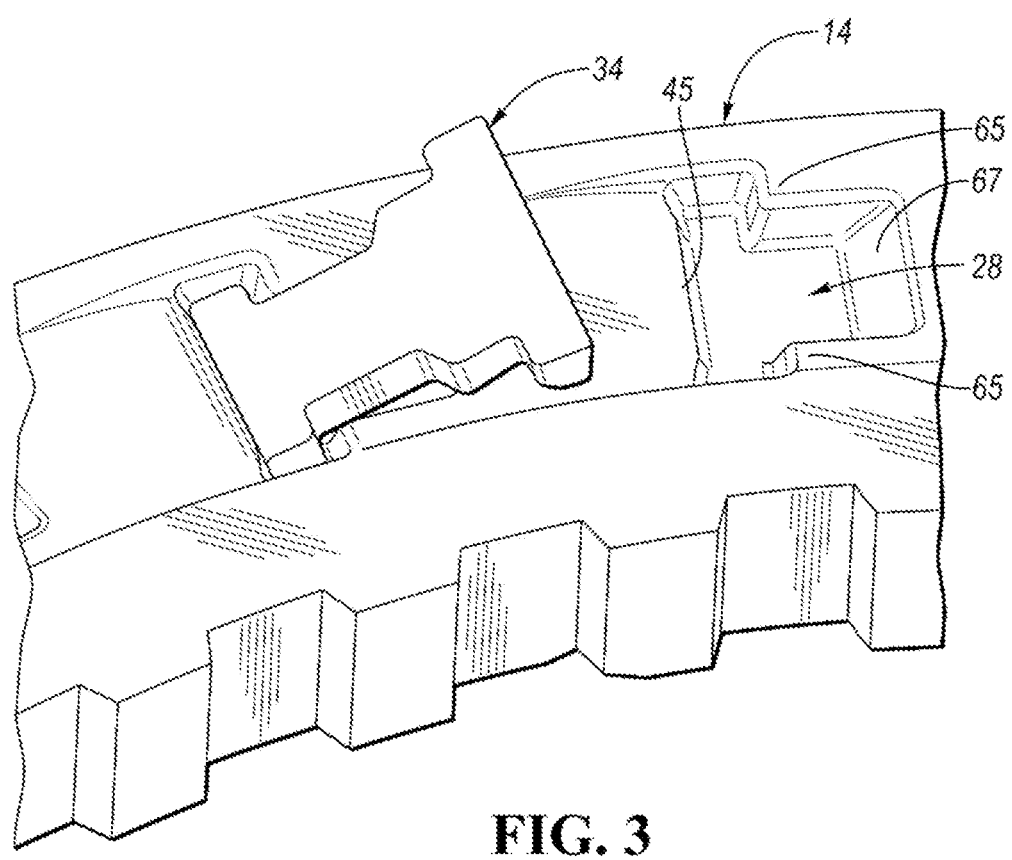
FIG. 3 is a perspective, schematic view, partially broken away, of a locking member in its fully engaged position within a notch of a notch plate constructed in accordance with at least one embodiment of the present invention.
Figure 5A:
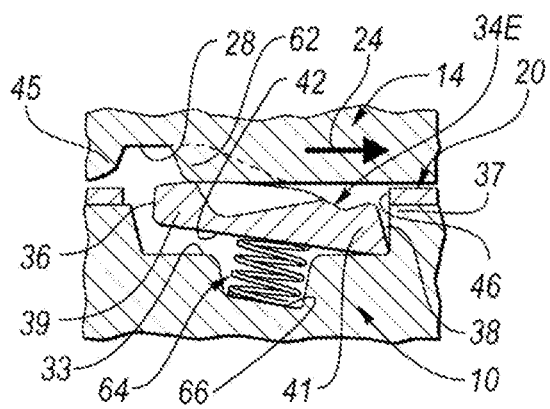
FIGS. 5A, 5B and 5C are views, partially broken away and in cross section, which show parts of the coupling assembly of FIGS. 4A, 4B, and 4C at the start of locking member rise, during the locking member rise and at locking member full engagement, respectively.
Figure 12:
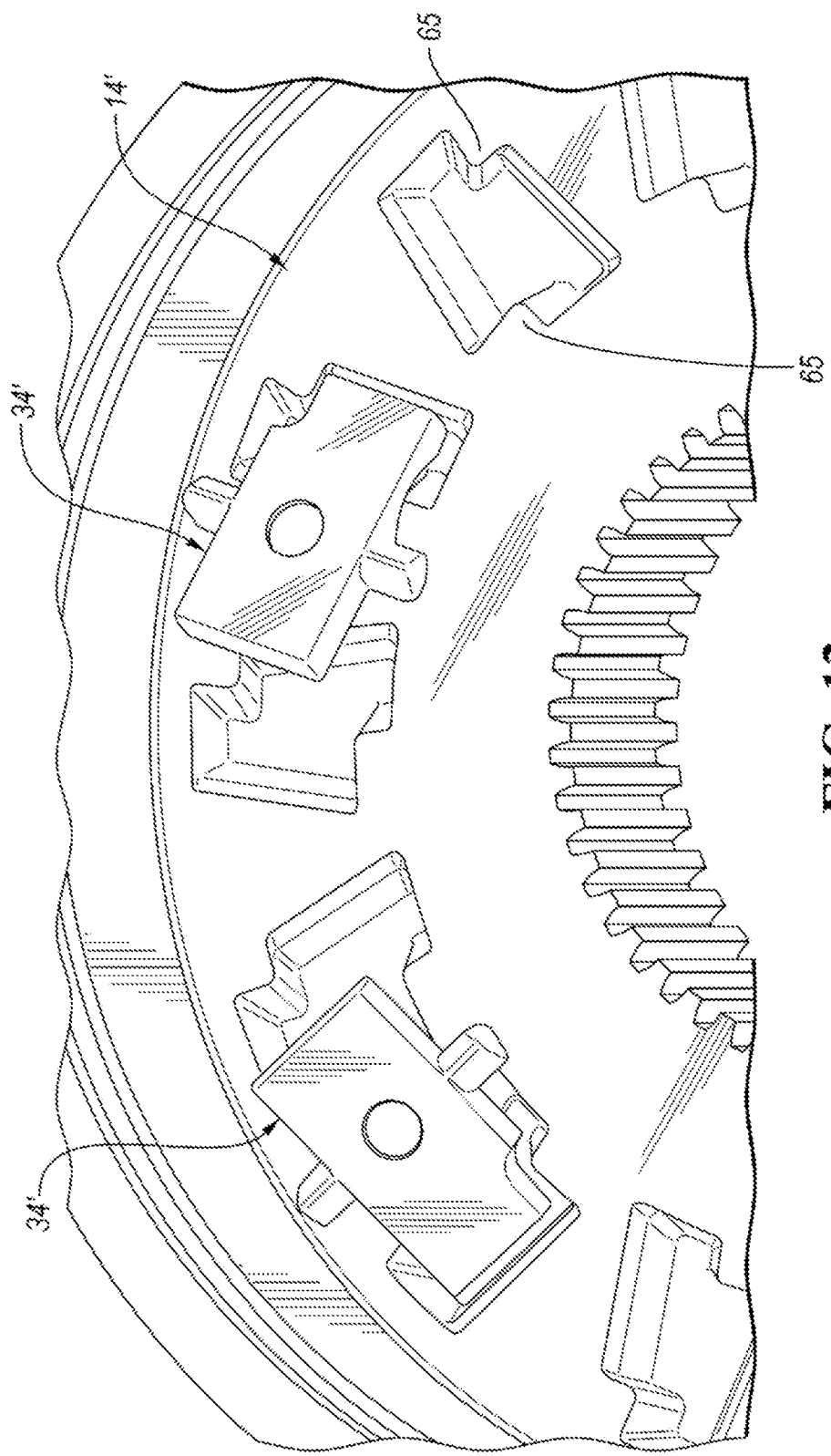
FIG. 12 is a top, perspective schematic view, partially broken away, to illustrate a teeter-totter or center pivot version of a ratcheting locking member and its associated coupling member constructed in accordance with at least one embodiment of the present invention.
Figure 14:
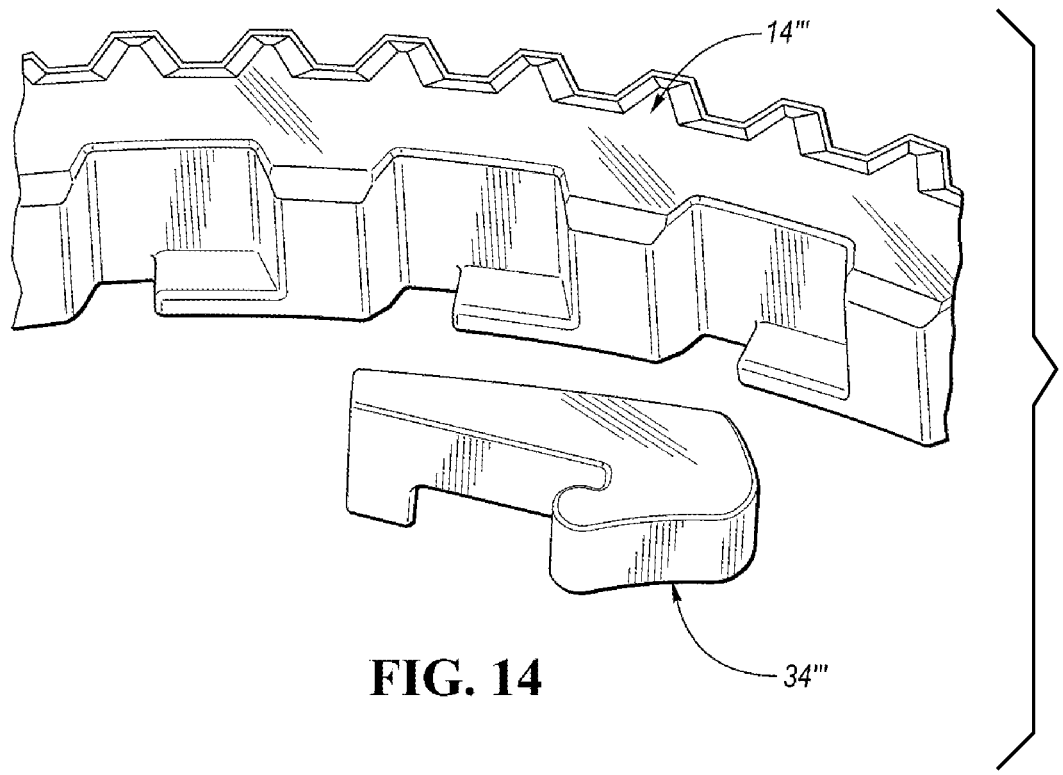
FIG. 14 is another view of the radial locking member and its associated coupling member from FIG. 13.

In embodiments, a blocking structure(s) may be associated only with locking member 34A-34L, only with notch plate 14, or with both locking member 34A-34AL and notch plate 14. A blocking structure associated with locking member 34A-34L may be a rib, protuberance, or protrusion on the locking member. In the schematic view of the various locking members 34A-34L, additional exemplary blocking structures associated with locking members 34A-34L are labeled with reference numeral 35. A blocking structure associated with notch plate 14 may be a rib, protuberance, or protrusion on coupling face 26 of the notch plate. In FIGS. 3, 12, and 14, additional exemplary blocking structures associated with notch plates 14 are labeled with reference numeral 65. In the configuration shown in FIG. 3, blocking structures 65 associated with notch plate 14 each function as a "release ledge" which define a "clearance feature" 67.

When control plate 20 is situated in its first position it does not cover the set of locking members 34A-34L. When control plate 20 is situated in its second position, it covers the set of locking members 34A-34L. When uncovered, locking members 34A-34L are allowed to ratchet above a predetermined speed of notch plate 14 relative to pocket plate 10 in direction 24. Below the predetermined speed, locking members 34A-34L abuttingly engage notches 28 of notch plate 14 to stop or prevent rotation between pocket plate 10 and notch plate 14 in the direction indicated by arrow 24.

In the example described above, control plate 20 is provided with a plurality of apertures 46. These are spaced and arranged angularly about the central axis. When control plate 20 is appropriately positioned in the first position, one aperture 46 will be disposed directly over each recess 33.

Apertures 46 and notches 28 are sized so that noses 39 of locking members 34A-34L can enter notches 28 of notch plate 14 and engage shoulders 45 of notches 28 to establish a locking action between locking members 34A-34L and notch plate 14 that will prevent or stop rotation between notch plate 14 and pocket plate 10.

When control plate 20 is rotated to a different (i.e., second) angular position from the first position, control plate 20 engages the top surface of locking members 34A-34L to cause the locking members to rotate downwardly about their pivots 70 into their recesses 33 and will be at least partially covered by control plate 20 and prevented from moving pivotally upward at an engagement point 72. When control plate 20 is thus positioned, notch plate 14 can free-wheel in direction 24 about the central axis with respect to pocket plate 10.

Locking member 34A-34L each have a pair of oppositely projecting ears 68 which extend laterally from their tail end 41.

Although any suitable locking member spring can be used with one embodiment of the invention, a coil spring 64 is located under each of locking members 34A-34L within spring pockets 66 formed in recesses 33.

When notch plate 14 is received within or nested within pocket plate 10 with control plate 20 therebetween, notch plate 14 and pocket plate 10 are held axially fast typically by a retainer ring or snap-ring (not shown). The snap-ring is received and retained in a groove formed in pocket plate 10. When assembled, control plate 20 is typically located within an annular groove (not shown) formed in pocket plate 10.

The locking members 34A-34L of FIGS. 2-11 can be characterized as ratcheting planar locking members. The locking member 34' of FIG. 12 is a ratcheting center pivot or teeter-totter locking member, generally indicated at FIG. 12, 34'. The locking member 34' is shown with its associated coupling member or notch plate 14'.

Figure 13:
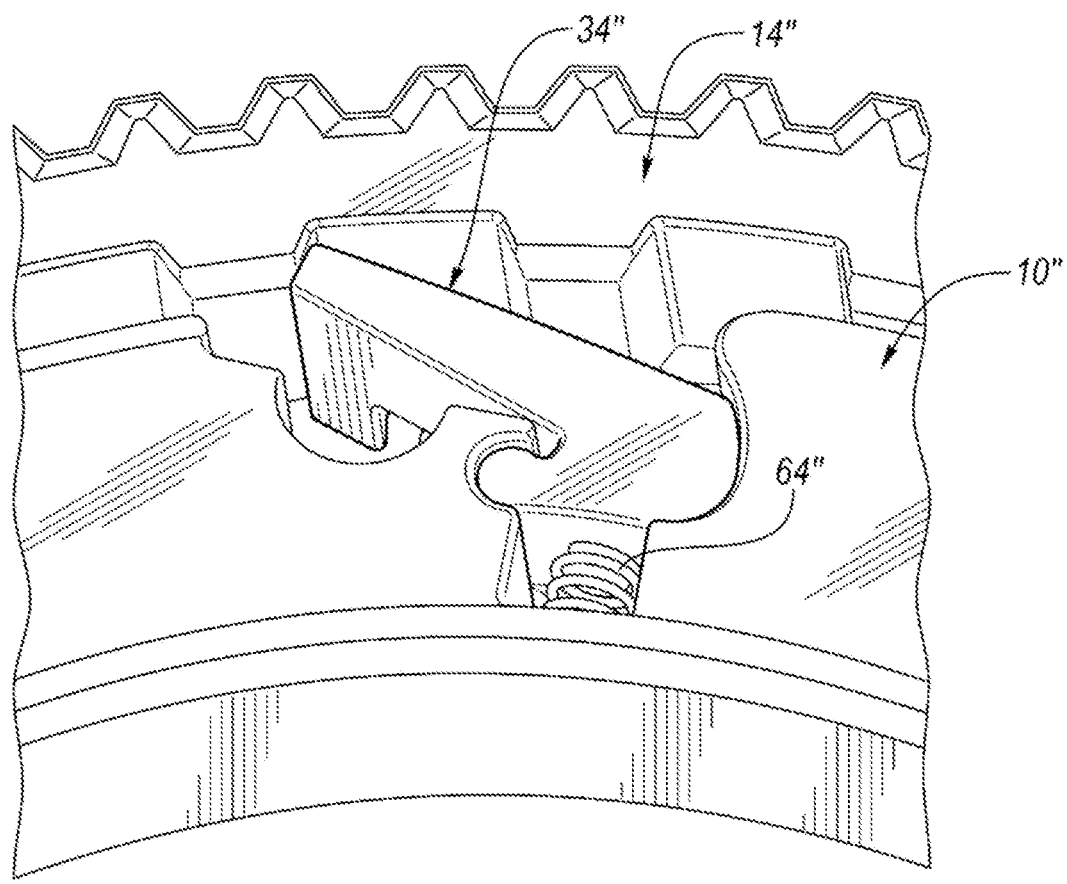
FIG. 13 is a side schematic, perspective view, partially broken away, of a radial version (i.e., radial locking member) of a ratcheting locking member and its associated coupling members constructed in accordance with at least one embodiment of the present invention.

The locking member of FIG. 13 can be characterized as a radial version of the planar locking member of FIGS. 2-11 and is generally indicated at FIG. 13, 34". The locking member 34" is shown biased by a spring 64" with its associated coupling members (i.e. notch and pocket plates 14" and 10", respectively). An expanded view of radial locking member 34" is generally indicated in FIG. 14. An alternate construction of a radial locking member is generally indicated at 34''' in FIG. 15. An expanded view of the notch plate 14" is generally indicated in FIG. 14.

Figure 15:
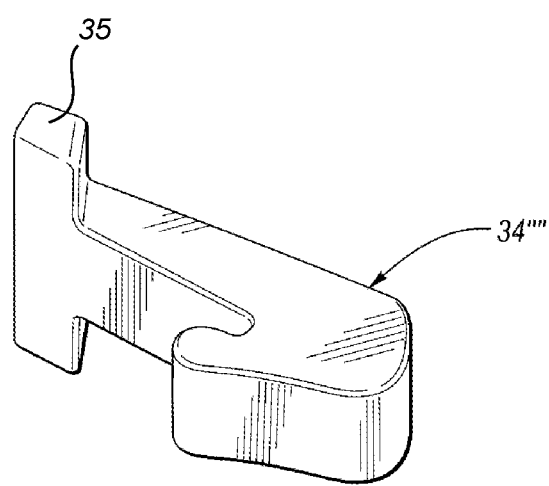
FIG. 15 is a view of an optional construction of a radial locking member.

Radial locking members 34" and 34''' of FIGS. 14 and 15, respectively, typically are not actuated by a selector plate but rather are actuated by a linear actuator.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A coupling assembly comprising:
first and second coupling members including first and second coupling faces, respectively, in close-spaced opposition with one another, wherein at least one of the coupling members is mounted for rotation about an axis;
a locking member disposed between the coupling faces of the coupling members, the locking member being movable between (i) a coupling position characterized by abutting-engagement of the locking member with each of the first and second coupling members and (ii) an uncoupling position characterized by non-abutting engagement of the locking member with at least the first coupling member; and
the locking member having a nose end, a tail end, and an end face at the nose end of the locking member, the locking member including an upper face of a main body portion and a recess in the upper face, the recess spaced from the nose end of the locking member; and
the recess cooperating with the first coupling member wherein a portion of the first coupling member is in the recess when the locking member is in the coupling position.

2. The coupling assembly of claim 1 wherein:
the abutting-engagement of the locking member with the first coupling member in the coupling position is further characterized by abutting-engagement of a nose of the locking member with a shoulder of the first coupling member.

3. The coupling assembly of claim 1 wherein:
the first coupling member is a notch plate and the second coupling member is a pocket plate.

4. The coupling assembly of claim 1 wherein:
the coupling assembly is a controllable or selectable one-way clutch assembly.

5. The coupling assembly of claim 1 further comprising:
a selector plate between the coupling faces and operable to control a position of the locking member, the selector plate having at least one opening which extends completely therethrough to allow the locking member to extend therethrough to the coupling position.

6. The coupling assembly of claim 1 wherein:
the locking member prevented from entering the coupling position while rotation of the first coupling member in an engagement direction relative to the second coupling member is above a predetermined rotational speed, the predetermined rotational speed is within a range of one to 200 revolutions per minute.

7. The coupling assembly of claim 1 further comprising:
a biasing member carried by the second coupling member to urge the locking member toward the coupling position.

8. The coupling assembly of claim 1 wherein:
the locking member is movable between the coupling and uncoupling positions by pivoting.

9. The coupling assembly of claim 1 wherein:
the locking member is a strut.

10. A coupling assembly comprising:
first and second coupling members including first and second coupling faces, respectively, in close-spaced opposition with one another, wherein at least one of the coupling members is mounted for rotation about an axis;
a locking member disposed between the coupling faces of the coupling members, the locking member being movable between (i) a coupling position characterized by abutting-engagement of the locking member with each of the first and second coupling members and (ii) an uncoupling position characterized by non-abutting engagement of the locking member with at least the first coupling member; and
a blocking structure, the blocking structure being a part of at least one of the locking member and the first coupling member, wherein the blocking structure prevents the locking member from entering the coupling position, and thereby prevents abutting engagement of the locking member with the first coupling member, while rotation of the first coupling member in an engagement direction relative to the second coupling member is above a predetermined rotational speed;
the blocking structure being a part of only the locking member; and
the blocking structure is a rib, protuberance, or protrusion on the locking member.

11. A coupling assembly comprising:
first and second coupling members including first and second coupling faces, respectively, in close-spaced opposition with one another, wherein at least one of the coupling members is mounted for rotation about an axis;
a locking member disposed between the coupling faces of the coupling members, the locking member being movable between (i) a coupling position characterized by abutting-engagement of the locking member with each of the first and second coupling members and (ii) an uncoupling position characterized by non-abutting engagement of the locking member with at least the first coupling member;
a blocking structure, the blocking structure being a part of at least one of the locking member and the first coupling member, wherein the blocking structure prevents the locking member from entering the coupling position, and thereby prevents abutting engagement of the locking member with the first coupling member, while rotation of the first coupling member in an engagement direction relative to the second coupling member is above a predetermined rotational speed;
the blocking structure is associated with being a part of both the locking member and the first coupling member; and
the blocking structure includes a rib, protuberance, or protrusion.

12. A locking member for use in a coupling assembly having first and second coupling members, the locking member comprising:
a body; and
a protrusion extending above an upper face of the locking member, the protrusion spaced from a nose end of the locking member, wherein protrusion prevents the locking member from entering a coupling position, characterized by abutting-engagement of the locking member with each of the first and second coupling members, while rotation of the first coupling member in an engagement direction relative to the second coupling member is above a predetermined rotational speed.

13. The locking member of claim 12 wherein:
the predetermined rotational speed is within a range of one to 200 revolutions per minute.

14. A locking member for use in a coupling assembly having first and second coupling members, the locking member comprising:
a body; and
a blocking structure on a portion of the body, wherein the blocking structure prevents the locking member from entering a coupling position, characterized by abutting-engagement of the locking member with each of the first and second coupling members, while rotation of the first coupling member in an engagement direction relative to the second coupling member is above a predetermined rotational speed; and
the blocking structure is a rib, protuberance, or protrusion.

15. The locking member of claim 14 wherein:
the body includes a nose;
the abutting-engagement of the locking member with the first coupling member in the coupling position is further characterized by abutting-engagement of the nose with a shoulder of the first coupling member; and
the blocking structure preventing the locking member from entering the coupling position thereby prevents abutting engagement of the nose with the shoulder of the first coupling member.

16. The locking member of claim 14 wherein:
the predetermined rotational speed is within a range of one to 200 revolutions per minute.

17. A locking member for use in a coupling assembly having first and second coupling members, the locking member comprising:
a body; and
a blocking structure on a portion of the body, wherein the blocking structure prevents the locking member from entering a coupling position, characterized by abutting-engagement of the locking member with each of the first and second coupling members, while rotation of the first coupling member in an engagement direction relative to the second coupling member is above a predetermined rotational speed;
the body includes a main body portion having an upper face; and
the blocking structure includes at least one integrally formed rib portion on the upper face of the main body portion.

18. The locking member of claim 17 wherein:
the rib portion is centrally located between side faces of the main body portion.

19. A coupling assembly comprising:
first and second coupling members including first and second coupling faces, respectively, in close-spaced opposition with one another, wherein at least one of the coupling members is mounted for rotation about an axis;
a locking member disposed between the coupling faces of the coupling members, the locking member being movable between (i) a coupling position characterized by abutting-engagement of the locking member with each of the first and second coupling members and (ii) an uncoupling position characterized by non-abutting engagement of the locking member with at least the first coupling member; and
the locking member having a lateral projection and the first coupling member having a release ledge, wherein the lateral projection contacts the release ledge preventing abutting engagement of the locking member with the first coupling member when rotation of the first coupling member in an engagement direction relative to the second coupling member is above a predetermined rotational speed.

20. The coupling assembly of claim 19 wherein:
the predetermined rotational speed is within a range of one to 200 revolutions per minute.

21. A coupling assembly comprising:
first and second coupling members including first and second coupling faces, respectively, in close-spaced opposition with one another, wherein at least one of the coupling members is mounted for rotation about an axis;
a locking member disposed between the coupling faces of the coupling members, the locking member being movable between (i) a coupling position characterized by abutting-engagement of the locking member with each of the first and second coupling members and (ii) an uncoupling position characterized by non-abutting engagement of the locking member with at least the first coupling member; and
the locking member having a protrusion and a recess and the first coupling member having a protrusion and a recess, the protrusion of the locking member disposed in the recess of the coupling member when the locking member is in the coupling position and the protrusion of the locking member is adjacent the protrusion of the coupling member when the locking member is in an uncoupled position.

22. The coupling assembly of claim 21 wherein:

the protrusion of the locking member extends laterally from a side surface of the main body portion of the locking member.

23. The coupling assembly of claim 21 wherein:

the protrusion of the locking member extends above an upper face of the main body portion of the locking member.

\* \* \* \* \*